(12) United States Patent
Geskes et al.

(10) Patent No.: US 11,777,148 B2
(45) Date of Patent: Oct. 3, 2023

(54) ACCUMULATOR

(71) Applicant: Mahle International GmbH, Stuttgart (DE)

(72) Inventors: Peter Geskes, Ostfildern (DE); Michael Moser, Ellwangen (DE); Georg Votteler, Backnang (DE)

(73) Assignee: Mahle International GmbH

( * ) Notice: Subject to any disclaimer, the term of this patent is extended or adjusted under 35 U.S.C. 154(b) by 579 days.

(21) Appl. No.: 16/838,005

(22) Filed: Apr. 1, 2020

(65) Prior Publication Data

US 2020/0321659 A1 Oct. 8, 2020

(51) Int. Cl.
*H01M 10/0585* (2010.01)
*H01M 50/211* (2021.01)
*H01M 50/227* (2021.01)

(52) U.S. Cl.
CPC ..... *H01M 10/0585* (2013.01); *H01M 50/211* (2021.01); *H01M 50/227* (2021.01)

(58) Field of Classification Search
CPC ......... H01M 10/0585; H01M 10/0481; H01M 10/0404; H01M 50/20; Y02E 60/10; Y02P 70/50
See application file for complete search history.

(56) References Cited

U.S. PATENT DOCUMENTS

| | | |
|---|---|---|
| 10,170,809 B2 | 1/2019 | Larsson |
| 10,243,180 B2 | 3/2019 | Brenner |
| 10,326,119 B2 | 6/2019 | Obrist et al. |
| 10,608,287 B2 | 3/2020 | Idikurt |

(Continued)

FOREIGN PATENT DOCUMENTS

| | | |
|---|---|---|
| CN | 104900822 A | 9/2015 |
| CN | 105596146 A | 5/2016 |

(Continued)

OTHER PUBLICATIONS

Chinese Office Action dated May 16, 2022 for copending Chinese App. No. CN202010255485.4 (with English translation).

(Continued)

*Primary Examiner* — Kiran Quraishi Akhtar
(74) *Attorney, Agent, or Firm* — Fishman Stewart PLLC (57) ABSTRACT

An accumulator may include a housing with at least two mutually opposite housing walls, accumulator cells arranged between the housing walls and following one another in a stacking direction, and at least one intermediate piece arranged in the housing between at least one of the accumulator cells and one of the housing walls and that retains the accumulator cells in the housing. At least one intermediate piece may be configured as a mutable intermediate piece in such a way that the mutable intermediate piece may be changeable between a first state having a first thickness extending in a spacing direction between the associated housing wall and the associated at least one of the accumulator cells, and a second state having a second thickness extending in the spacing direction, wherein the second thickness may be greater than the first thickness. In the state in which the mutable intermediate piece and the accumulator cells may be arranged in the housing, the mutable intermediate piece may be changed into the second state.

20 Claims, 4 Drawing Sheets

(56) References Cited

U.S. PATENT DOCUMENTS

| | | | |
|---|---|---|---|
| 10,804,580 B2 | 10/2020 | Kim | |
| 2013/0236751 A1* | 9/2013 | Seong | H01M 50/211 |
| | | | 429/61 |
| 2016/0293913 A1* | 10/2016 | Brenner | H01M 10/0413 |
| 2018/0123100 A1 | 5/2018 | Fees et al. | |
| 2018/0254535 A1* | 9/2018 | Kim | H01M 10/6555 |
| 2018/0269545 A1 | 9/2018 | Liu | |

FOREIGN PATENT DOCUMENTS

| | | |
|---|---|---|
| CN | 105993085 A | 10/2016 |
| CN | 106420167 A | 2/2017 |
| CN | 107078311 A | 8/2017 |
| CN | 108352461 A | 7/2018 |
| CN | 109075275 A | 12/2018 |
| DE | 102013202288 A1 | 8/2014 |
| DE | 102014 114 019 A1 | 3/2016 |
| EP | 2 866 289 A1 | 4/2015 |
| WO | 2013131606 A1 | 9/2013 |

OTHER PUBLICATIONS

Chinese Search Report dated Apr. 19, 2022 for copending Chinese App. 202010255485.4 (with English translation) No. CN202010255485.4).

* cited by examiner

ACCUMULATOR

CROSS-REFERENCE TO RELATED APPLICATIONS

This application claims priority to German Patent Application No. DE 10 2019 204 652.5, filed on Apr. 2, 2019, the contents of which are hereby incorporated by reference in their entirety.

TECHNICAL FIELD

The present invention relates to an accumulator having a plurality of accumulator cells which follow one another in a stacking direction and which are accommodated in a housing having two mutually opposite housing walls. The invention further relates to a method for producing such an accumulator.

BACKGROUND

Batteries which are charged and discharged during operation, also termed accumulators, also play an increasingly important role in mobile applications. Such accumulators are also increasingly used in vehicles.

An accumulator customarily has a plurality of accumulator cells which follow one another in a stacking direction. Such an accumulator is known from EP 2 866 289 A1, for example. This document proposes a mode of construction of the accumulator in which successive accumulator cells can be differently dimensioned and are provided laterally in each case with porous separating elements.

As a rule, the accumulator cells of an accumulator are arranged in a housing of the accumulator. The housing customarily has at least two mutually opposite housing walls between which the accumulator cells are accommodated. To produce such an accumulator, the accumulator cells are inserted between the housing walls until they reach an end position. The housing is subsequently generally closed, for example by a cover.

In order to retain the accumulator cells in the housing between the housing walls, use is customarily made of at least one intermediate piece which, in the end position of the accumulator cells, is adjacent to at least one of the accumulator cells. To ensure the retention of the accumulator cells in the housing, it is necessary that the intermediate piece loads, in particular prestresses, the accumulator cells in the housing.

To produce the accumulator, it is conceivable to insert the intermediate piece jointly with the accumulator cells into the housing. This means, already before reaching their end position, that the accumulator cells are loaded against the housing, in particular against the housing walls, and/or against one another, with the result that damage can occur to at least part of the accumulator cells.

It is also conceivable to insert the accumulator cells into the housing first and then the at least one intermediate element. For this purpose, it is necessary as a rule to displace the accumulator cells in the housing in order to be able to insert the intermediate piece, thereby again risking damage to at least part of the accumulator cells.

In a further variant, it is conceivable to introduce the at least one intermediate piece into the housing first and then to insert the accumulator cells into the housing. Here, the intermediate piece acts on the accumulator cells upon insertion, with the result that they are again loaded and can be damaged.

In order to reduce such damage to the accumulator cells, it is conceivable to provide the respective intermediate element with a reduced-friction, in particular high-slip, surface, for example made of Teflon. It is conceivable in particular to produce the intermediate pieces in each case as a Teflon plate. This leads to increased production costs of the intermediate pieces and thus of the accumulator.

SUMMARY

The present invention is therefore concerned with the object of specifying, for an accumulator of the type stated at the outset and for a method for producing such an accumulator, improved or at least different embodiments which are distinguished in particular by a simplified and/or cost-effective production or assembly and/or by a reduced risk of damage to the accumulator cells of the accumulator.

This object is achieved according to the invention by the subject matter of the independent claims. Advantageous embodiments form the subject matter of the dependent claims.

The present invention is based on the general concept of providing, in the case of an accumulator having a plurality of accumulator cells which are arranged in a housing and follow one another in a stacking direction, an intermediate piece in the housing for holding the accumulator cells in the housing, said intermediate piece being able to assume a first state and a second state having a thickness which is greater in relation to the first state, wherein the intermediate piece assumes the second state only when the accumulator cells and the intermediate piece have already been arranged in the housing. That is to say that loading or prestressing of the accumulator cells occurs only when the accumulator cells and said intermediate piece have already been arranged in the housing. On the one hand, this achieves a simplified arrangement of the accumulator cells and of the intermediate element in the housing, with the result that the production of the accumulator is simplified. On the other hand, damage to the accumulator cells and/or to the intermediate piece due to the arrangement of the accumulator cells and/or the intermediate piece in the housing is prevented or at least reduced.

According to the concept of the invention, the accumulator has a plurality of accumulator cells and the housing. The housing has at least two mutually opposite housing walls. The accumulator cells are arranged in, in particular inserted into, the housing in such a way that, in an end position, they follow one another in the stacking direction and are arranged between the housing walls. In addition, the accumulator has at least one intermediate piece which is arranged in the end position between one of the housing walls and at least one of the accumulator cells. At least one of the at least one intermediate piece is configured in the manner according to the invention and is subsequently referred to as a mutable intermediate piece. Here, each intermediate piece, each x-th intermediate piece or an outer intermediate piece or the two outer intermediate pieces in the stacking direction can be configured as a mutable intermediate piece. The mutable intermediate piece can be changed between a first state and a second state, wherein, in the first state, the mutable intermediate piece has a first thickness extending in a spacing direction between the associated housing wall and the associated at least one accumulator cell and, in the second state, a second thickness which extends in the spacing direction and which is greater than the first thickness. According to the invention, the mutable intermediate piece is arranged in the housing in the first state and changed into the second state only when the accumulator cells have reached their end position. That is to say that the mutable intermediate piece is changed into the second state after the accumulator cells reach the end position and the mutable intermediate piece is arranged between the associated housing wall and the associated at least one accumulator cell.

The associated housing wall of the respective mutable intermediate piece is that housing wall between which and the at least one accumulator cell the mutable intermediate piece is arranged. The at least one associated accumulator cell of the respective mutable intermediate piece is analogously that at least one accumulator cell between which and the associated housing wall the mutable intermediate piece is arranged.

The change of the respective mutable intermediate piece between these two states can occur actively or passively, in particular can be induced. This change can occur in particular by an expansion of the mutable intermediate piece.

The order in which the accumulator cells and the intermediate pieces are arranged in, in particular introduced into, the housing is in principle arbitrary if the mutable intermediate piece is changed into the second state only when the accumulator cells are situated in the end position and the mutable intermediate piece is likewise arranged in the housing. It is possible for example for first the accumulator cells and then the at least one mutable intermediate piece to be arranged in the housing, or vice versa. It is also conceivable to first provide a module or an assembly of the accumulator cells and the at least one intermediate piece together with mutable intermediate piece and to arrange this module or assembly in the housing, with then the at least one mutable intermediate piece being changed into the second state. The respective mutable intermediate piece can here be part of the module or assembly and thus be arranged jointly therewith in the housing or be separate therefrom and be arranged separately in the housing.

The accumulator cells are advantageously inserted into the housing in an insertion direction.

The end position of the accumulator cells is preferably that position from which the accumulator cells are not inserted further in the insertion direction into the housing. That is to say in particular that the end position is that position from which no active displacements of the accumulator cells in the insertion direction continue to occur.

A change of the respective mutable intermediate piece into the second state particularly preferably occurs when this mutable intermediate piece has been arranged completely in the housing, that is to say has reached a final position, with the final position expediently being that from which no active displacements of the mutable intermediate piece in the housing, in particular transversely to the associated spacing direction, continue to occur.

The second thickness of the at least one mutable intermediate piece is advantageously such that, in the second state of the at least one mutable intermediate piece, the accumulator cells are loaded, in particular prestressed, against one another and/or against at least one of the housing walls, preferably against both housing walls. The accumulator cells are thus retained in the housing with the aid of the at least one intermediate piece.

It is preferable here if the loading or prestressing of the accumulator cells occurs flatly.

In addition to the at least one mutable intermediate piece, the accumulator can also have such an intermediate piece which is not changed, in particular is not changeable, between the first state and a second state. For this reason, all intermediate pieces are subsequently referred to generally as intermediate pieces and those intermediate pieces which are changeable and are changed between the first state and the second state are referred to as mutable intermediate pieces.

At least one of the intermediate pieces which is not changeable between the first state and a second state can take the form of a metal plate which is arranged between two accumulator cells and which transports the heat arising in the accumulator cells outwardly transversely to the stacking direction. This allows simplified temperature control, in particular cooling, of the accumulator.

The accumulator cells can each be configured in any desired manner.

In particular, the respective accumulator cell can be such a one having a structure which is stacked, in particular in the stacking direction. The respective accumulator cell can be a pouch cell which has a closed metal foil which as a rule has at least one weld or a weld seam and in which at least one electrode and at least one active material of the accumulator cell are accommodated. It is also conceivable that the respective accumulator cell is designed as a prismatic cell which resembles the pouch cell but has a metal housing in which at least one electrode and at least one active material are accommodated.

It is preferable to arrange at least one of the at least one mutable intermediate piece to follow one of the accumulator cells in the stacking direction. Here, the housing has two housing walls which are opposite one another in the stacking direction and between which the accumulator cells are arranged in the end position such that the mutable intermediate piece is/has been arranged in the stacking direction between one of these housing walls, which is the associated housing wall, and at least one of the accumulator cells. In this case, the spacing direction thus corresponds to the stacking direction or the spacing direction extends parallel to the stacking direction, with the result that, in the second state, the mutable intermediate piece loads, in particular prestresses, the accumulator cells in the stacking direction against one another and/or against at least one of the housing walls situated opposite one another in the stacking direction.

Alternatively or additionally, at least one of the at least one mutable intermediate piece can be arranged transversely to the stacking direction between at least one of the accumulator cells and one of two housing walls situated opposite one another transversely to the stacking direction. In this case, the housing thus has at least two housing walls situated opposite one another transversely to the stacking direction, with the mutable intermediate piece being arranged between one of these housing walls, which is the associated housing wall, and at least one of the accumulator cells, preferably a plurality of the accumulator cells. In this case, the spacing direction and thus the thicknesses of the mutable intermediate piece thus extend transversely to the spacing direction. In such an arrangement, in the second state of the mutable intermediate piece, the at least one accumulator cell is loaded, in particular prestressed, transversely to the stacking direction against at least one of the housing walls situated opposite one another transversely to the stacking direction.

In preferred embodiments, at least one of the at least one mutable intermediate piece has a deformable envelope, wherein, to change from the first state into the second state, a filler is introduced into the envelope. That is to say in particular that the filler is introduced into the envelope only when the accumulator cells have reached their end position.

The filler can in principle take any desired form.

The filler is advantageously such a one which is at least partially fluidic or part-fluidic. This allows a simplified introduction of the filler into the envelope and thus a simplified change of the mutable intermediate piece into the second state.

The filler can preferably be removed from the envelope, for example extracted by suction, with the result that the mutable intermediate piece can also change from the second state into the first state. The change between the first state and the second state is thus reversible. This particularly allows the respective accumulator cell, for example for maintenance purposes, to be able to be removed from the housing in a simplified manner, with moreover damage to the accumulator cell by the removal per se being prevented or at least reduced.

The envelope of the mutable intermediate piece is in principle any desired envelope, that is to say such a one which can also be arranged within the mutable intermediate piece.

The envelope of the mutable intermediate piece is advantageously an outer envelope of the mutable intermediate piece. This leads to a simplified structure of the mutable intermediate piece and to a simplified change of the mutable intermediate piece between the first state and the second state.

The envelope of the mutable intermediate piece can in principle be produced from any desired substance or material.

Embodiments are preferred in which the envelope is flexible, in particular elastic, in order to allow a simplified change of the mutable intermediate piece between the first state and the second state. In particular, the envelope is such a one made of plastic, that is to say a plastic envelope which is deformable. Also conceivable are embodiments in which the envelope is a deformable film.

Embodiments are particularly preferred in which the mutable intermediate piece is flexible in the spacing direction in the second state. The flexibility is such that operationally induced temperature differences of the accumulator, which can occur in particular during charging and discharging of the accumulator cells, can be compensated for.

The filler can be a gas, in particular air. There is thus provided a cost-effective filler which can be introduced into the envelope and/or removed from the envelope in a simple manner. In addition, such fillers allow flexibility of the mutable intermediate piece in the spacing direction.

It is also conceivable that the filler is a liquid, a gel or a foam. Such fillers lead to an increased stability of the mutable intermediate piece in the second state, and they further allow a flexibility of the mutable intermediate piece.

Such fillers, in particular such gels and/or foams, which at least partially cure after being introduced into the envelope are conceivable.

The respective intermediate piece, in particular the at least one mutable intermediate piece, is advantageously produced from and composed of such materials and/or substances that it has a good thermal conductivity in order to be able to transport away in a simplified manner the heat arising in the accumulator, in particular in the respective accumulator cell, during operation. For this purpose, the respective intermediate piece can also contain an additive having correspondingly increased heat conductivities, for example silicone and/or a metal oxide and/or a metal and/or a metal alloy. The additive can be present in particular in the form of particles. In particular, it is conceivable to provide the filler with at least one such additive.

In principle, it is conceivable to design the envelope of at least one mutable intermediate piece to be open. In this case, it is advantageous if the filler is such a one which cures after being introduced into the envelope and thus correspondingly fills said envelope.

Embodiments are advantageous in which the envelope of at least one of the mutable intermediate pieces is designed to be closed. This allows simplified introduction of the filler into the envelope and the use of in principle any desired fillers.

Embodiments are conceivable in which, to introduce the filler into the envelope, a breach which severs the material of the envelope is made in the otherwise closed envelope. This preferably occurs here in the state in which the mutable intermediate piece is arranged in the housing, preferably moreover in the end position of the at least one associated accumulator cell.

The breach can be made in principle in any desired manner.

It is conceivable to make the breach with the aid of a tool, for example a piercing tool.

It is advantageous here if the piercing tool is mounted on a cover of the housing that closes the housing and is advantageously separate from the housing walls. It is thus possible first to arrange in the housing the constituent parts of the accumulator that are to be arranged in the housing, then, if desired and/or necessary, to carry out an inspection of the accumulator and, in the presence of defects and/or faults, to remedy them, and then to close the housing with the aid of the cover, with it only then being the case that at least one of the at least one mutable intermediate piece is changed into the second state and thus loads and prestresses the accumulator cells. It is thus possible to prevent a situation in which undesired defects and faults can be detected and/or remedied if the mutable intermediate piece has already changed into the second state.

Alternatively or additionally, it is conceivable to make the breach by local heating of the envelope. In particular, the local heating can occur via the housing such that it is possible in turn to make the breach when the constituent parts of the accumulator are arranged in the housing and/or the housing is closed, for example with a cover.

Alternatively or additionally, it is conceivable to provide the otherwise closed envelope with an opening which can be provided in particular by a nozzle, wherein the filler is introduced through this opening into the envelope. It is thus possible to dispense with subsequently providing the envelope with a breach.

Variants are preferred in which the accumulator is provided with a closing element, which can be constituent part of a closing mechanism, wherein the closing mechanism automatically closes the breach and/or the opening after the filler has been introduced into the envelope and the mutable intermediate piece has the second state. Such an automatic closure can be realized for example with the aid of an elastomer disc which closes the opening or the breach. Particularly if use is made of a piercing tool, it is conceivable for the latter also to be pierced through the elastomer disc, which then closes itself and the breach.

The closing element is preferably mounted on the housing. Embodiments are also conceivable in which the closing element is mounted on the envelope, in particular on the outer side thereof.

It goes without saying that a manual closing of the opening and/or of the breach is also conceivable. For this purpose, use can be made of closing elements in the manner of plugs and the like.

The introduction of the filler into the envelope can occur actively and/or passively. In the case of an active introduction of the filler, the filler is delivered into the envelope. For this purpose, use can be made of a delivery device, for example a pump.

In the case of a passive introduction of the filler into the envelope, the filler is sucked into the envelope. For this purpose, in the first state, a negative pressure is advantageously created in the envelope such that, to change into the second state, the filler is sucked into the envelope. In addition, after the passive introduction of the filler into the envelope, additional filler can still be introduced actively. This increases the filling level in the envelope. The filling level can be set in a pressure-dependent manner, for example.

Embodiments are conceivable in which at least one of the at least one mutable intermediate pieces has an, in particular elastic, body which is deformable in the spacing direction. Here, the body expands for adjustment into the second state in the spacing direction, in particular expands in the spacing direction.

Such a body can at least partially contain foam rubber such that the filler penetrates into the foam rubber and expands the body to change the mutable intermediate piece into the second state. It is thus possible to use a simple and cost-effective filler. Moreover, it is possible in this way to achieve a mechanically stable loading, in particular pre-stressing, of the accumulator cells and/or an improved mechanical stability of the mutable intermediate piece.

The body can be a mat, that is to say in particular a foam rubber mat.

The body is preferably arranged, in particular accommodated, in the envelope. This facilitates the handling of the mutable intermediate piece and also leads to a simplified change of the mutable intermediate piece into the second state. It is preferable here if the envelope is closed and the body is accommodated in the envelope.

It is preferable if at least one of the intermediate pieces, in particular at least one of the mutable intermediate pieces, adjoins at least one of the accumulator cells. A compact structure of the accumulator is thus possible and an effective loading and thus retention of the accumulator cells in the housing is achieved.

It is conceivable in particular to arrange such an intermediate piece, at least one such mutable intermediate piece, between two accumulator cells in the stacking direction.

Embodiments are advantageous in which at least one such mutable intermediate piece is arranged between one of the housing walls situated opposite one another in the stacking direction and an accumulator cell situated at the end side in the stacking direction. This simplifies the introduction of the accumulator cells and of the mutable intermediate piece into the housing. It is conceivable here to arrange in each case one such mutable intermediate piece between both end-side accumulator cells and one of the housing walls situated opposite one another in the stacking direction. These two mutable intermediate pieces thus load the accumulator cells situated between them against one another, thus prestress them against one another, with the result that a stable and secure retention of the accumulator cells in the housing is provided.

Of course, it is also possible to arrange at least one intermediate piece, in particular a mutable intermediate piece, between two of the accumulator cells such that said intermediate piece is adjacent to two accumulator cells in the stacking direction. It is preferred here if the mutable intermediate piece arranged between one of the housing walls and one of the accumulator cells situated at the end side in the stacking direction has a greater thickness in the second state than the intermediate piece, in particular mutable intermediate piece, arranged between the accumulator cells. This leads to a simple production of the accumulator with a secure retention of the accumulator cells and avoids or at least reduces damage to the accumulator cells.

It will be understood that, in addition to the accumulator, the method for producing the accumulator also belongs to the subject matter of this invention.

Further important features and advantages of the invention will emerge from the dependent claims, from the drawings and from the associated description of the figures on the basis of the drawings.

It will be understood that the features stated above and those still to be explained below can be used not only in the respectively specified combination but also in other combinations or on their own without departing from the scope of the present invention.

Preferred exemplary embodiments of the invention are illustrated in the drawings and will be explained in more detail in the following description, with identical reference signs referring to identical or similar or functionally identical components.

BRIEF DESCRIPTION OF THE DRAWINGS

In the drawings, in each case schematically.

DETAILED DESCRIPTION

Figure 1:
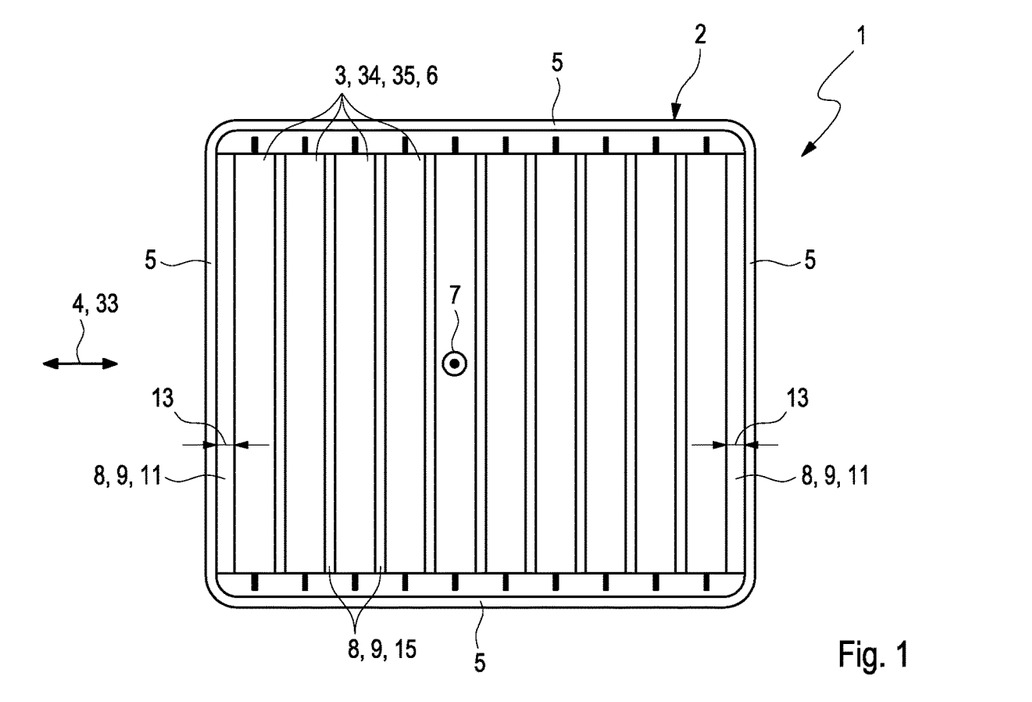
FIG. 1 shows a side view of an accumulator.
Figure 8:
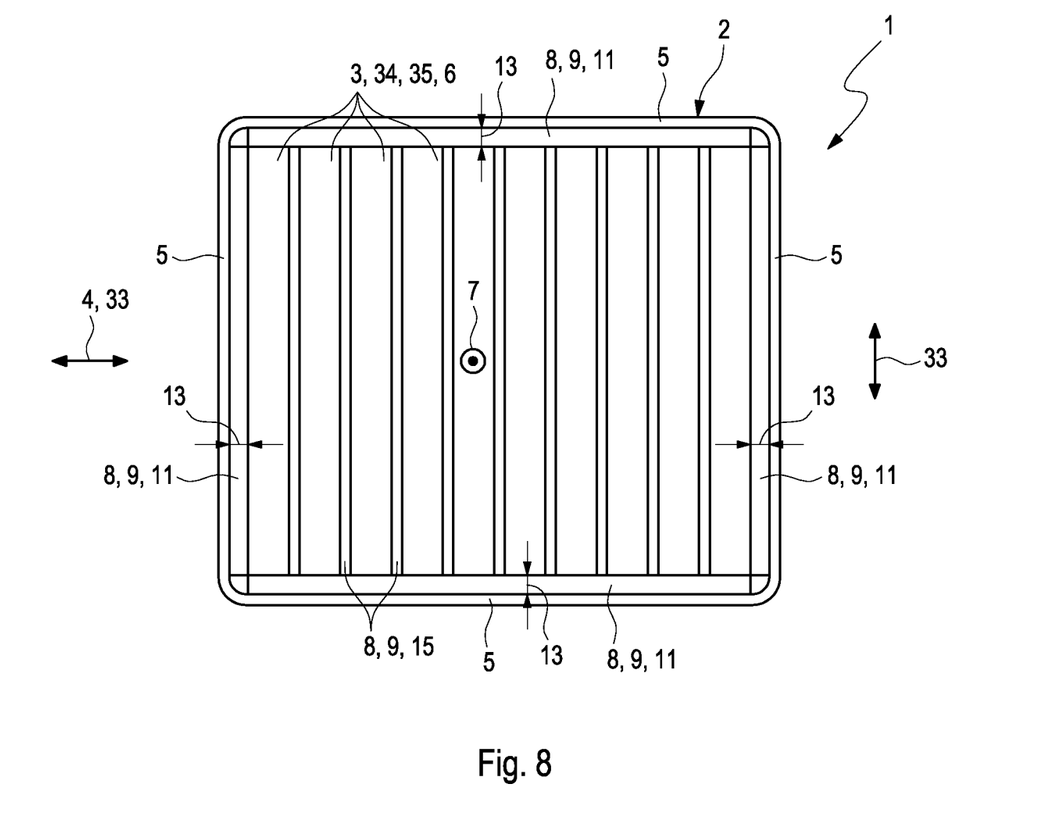
FIG. 8 shows the view from FIG. 1 in another exemplary embodiment of the accumulator.

An accumulator 1, as is shown for example in FIGS. 1 and 8, has a housing 2 and a plurality of accumulator cells 3. The housing 2 has at least two mutually opposite housing walls 5. The accumulator cells 3 follow one another in a stacking direction 4 and are arranged in the housing 2. In an end position 6 shown in FIGS. 1 and 8, the accumulator cells 3 have been completely inserted into the housing 5 in an insertion direction 7 transversely to the stacking direction 4. The housing 2 shown has in each case two mutually opposite housing walls 5, namely two housing walls 5 situated opposite one another in the stacking direction 4, and two housing walls 5 situated opposite one another transversely to the stacking direction 4 and transversely to the insertion direction 7. The accumulator 1 also has at least one intermediate piece 8 which is arranged in the housing 2 between the housing walls 5. Here, the respective intermediate piece 8 is arranged between one of the housing walls 5 and at least one of the accumulator cells 3. The intermediate pieces 8 load the accumulator cells 3 and thus retain them in the housing 2.

At least one of the intermediate pieces 8 here takes the form of a mutable intermediate piece 9. The respective mutable intermediate piece 9 is changeable from a first state 10 shown in FIG. 3 into a second state 11 shown in FIG. 1, wherein a first thickness 12 of the mutable intermediate piece 9 that extends in a spacing direction 33 between the associated housing wall 5 and the associated at least one accumulator cell 3 is smaller in the first state 10, termed first thickness 12 below, than a thickness 13 of the mutable intermediate piece 9 that extends in the spacing direction 33 in the second state 11, termed second thickness 13 below.

The thickness 12 of the mutable intermediate piece 9 that extends in the stacking direction 4 is smaller in the first state 10, also termed first thickness 12 below, than a thickness 13 of the mutable intermediate piece 9 that extends in the stacking direction 4 in the second state 11, also termed second thickness 13 below. The associated housing wall 5 of the respective mutable intermediate piece 9 is that housing wall 5 between which and the at least one accumulator cell 3 the mutable intermediate piece 9 is arranged. The at least one associated accumulator cell 3 of the respective mutable intermediate piece 9 is analogously that at least one accumulator cell 3 between which and the associated housing wall 5 the mutable intermediate piece 9 is arranged.

In the example shown in FIG. 1, the respective intermediate piece 8 is arranged to follow one of the accumulator cells 3 in the stacking direction 4. Accordingly, the spacing directions 33 and thus the thicknesses 12, 13 of these mutable intermediate pieces 9 extend parallel to the stacking direction 4. In the example shown in FIG. 8, in each case a mutable intermediate piece 9 is additionally arranged between one of the housing walls 5 situated opposite one another transversely to the stacking direction 4 and the accumulator cells 3, with the result that the spacing direction 33 and thus the thicknesses 12, 13 of these mutable intermediate pieces 9 extend transversely to the stacking direction 4. Accordingly, two spacing directions 33 extending transversely to one another can be seen in FIG. 8.

Figure 2:
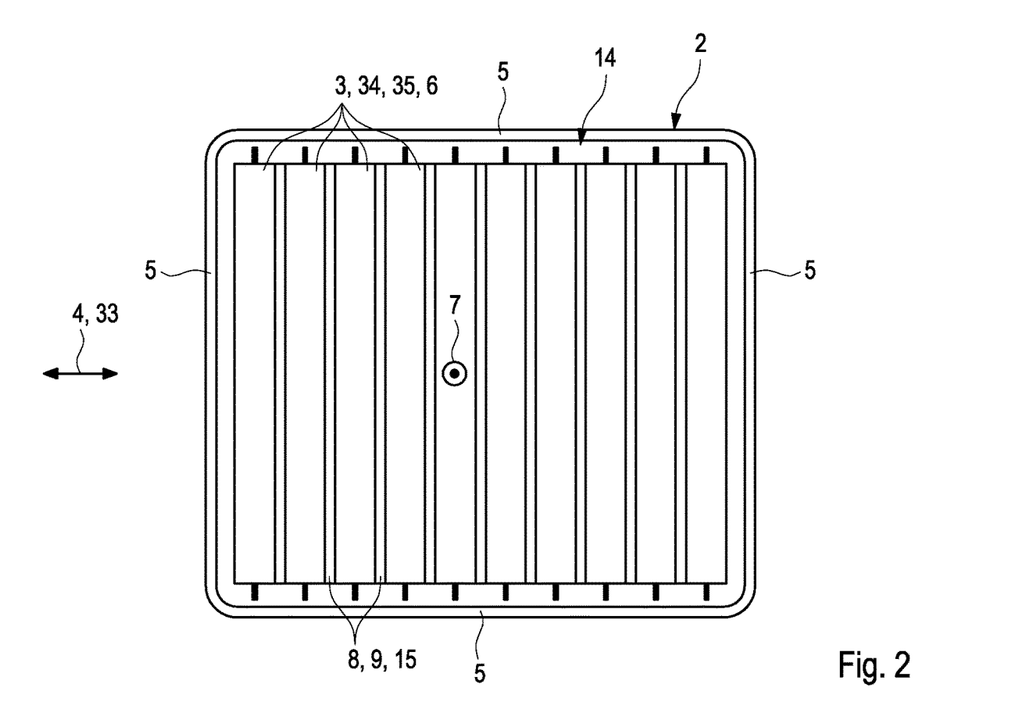
FIG. 2 and FIG. 3 show the view from FIG. 1 during different method steps for producing the accumulator.

To produce the accumulator 1, as shown in FIG. 2, the accumulator cells 3 are inserted into the housing 2, with FIG. 2 showing the end position 6 of the accumulator cells 3.

Figure 3:
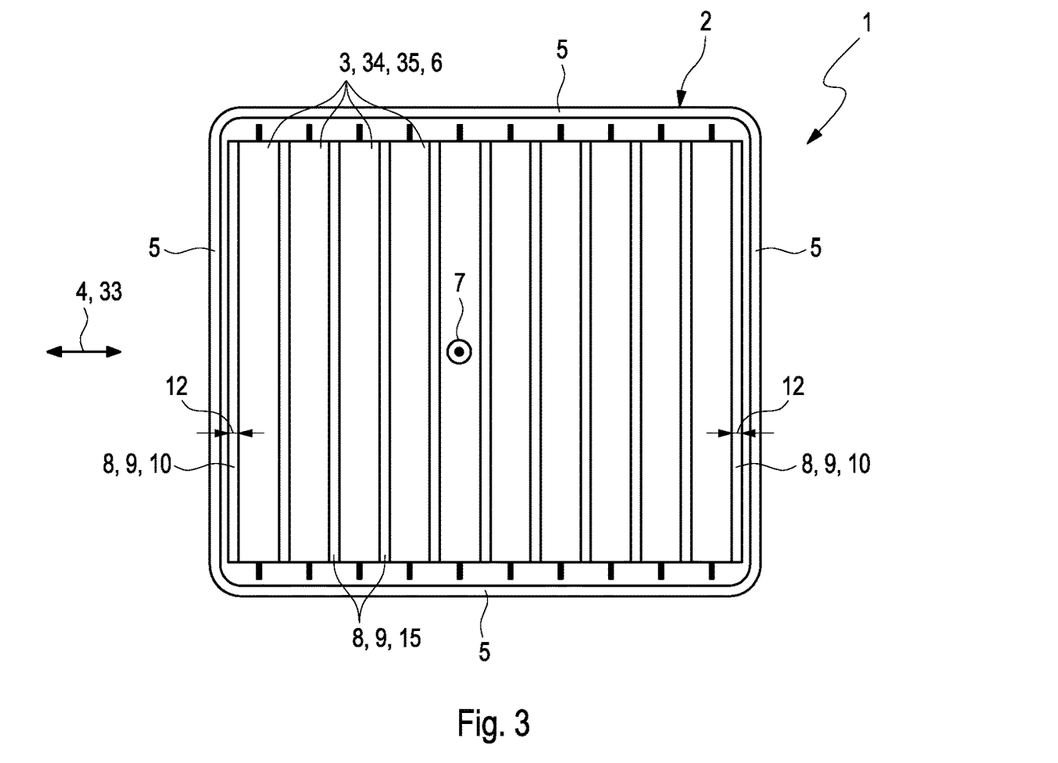

Then, as shown in FIG. 3, at least one of the at least one mutable intermediate piece 9 is arranged in the housing 2 in the first state 10, in particular inserted in the insertion direction 7. Alternatively, it is conceivable to insert at least one of the at least one mutable intermediate piece 9 jointly with the accumulator cells 3 into the housing 2. It is also conceivable first to arrange at least one of the at least one mutable intermediate piece 9 in the housing 2 and then to insert the accumulator cells 3 into the housing 2. If the accumulator cells 3 have reached their end position 6 and if at least one of the at least one mutable intermediate piece 9 is arranged in the housing 2 in such a way that it is arranged between the associated at least one accumulator cell 3 and the associated housing wall 5, the mutable intermediate piece 9 is changed into the second state 11 shown in FIG. 1 and FIG. 8. In the second state 11, as described above, the accumulator cells 3 are loaded and prestressed and thus retained in the housing 2. This makes it possible to insert the accumulator cells 3 into the housing 2 with little expenditure of force, in particular without, or with only slight, contact with the housing 2, in particular with the housing walls 5. This also allows the at least one mutable intermediate piece 9 to be arranged in the housing 2 with reduced action of force on the accumulator cells 3, preferably without action of force on the accumulator cells 3. It is only then that the accumulator cells 3 are loaded and prestressed against one another and/or against the housing walls 5 by the change of the at least one mutable intermediate piece 9 into the second state 11, with the result that said accumulator cells are retained between the housing walls 5 in the housing 2.

In the examples shown, the accumulator 1 has in each case one of the intermediate pieces 8 between accumulator cells 3 which follow one another in the stacking direction 4. These intermediate pieces 8 can form a coherent module 14 with the accumulator cells 3, said module being shown in particular in FIG. 2, and being inserted into the housing 2, with the result that these intermediate pieces 8 and the accumulator cells 3 are inserted jointly into the housing 2. In principle, it is conceivable that at least one of the mutable intermediate pieces 9 is also a constituent part of this module (not shown).

In the examples shown, the accumulator 1 has at least one such mutable intermediate piece 9 which is arranged between one of the housing walls 5 and the end-side accumulator cell 3 situated opposite in the stacking direction 4. In the example shown, such an associated mutable intermediate piece 9 is arranged here between both housing walls 5 and the end-side accumulator cell 3 situated opposite in each case in the stacking direction 4.

As an alternative to the described insertion of the mutable intermediate pieces 9 between the outermost accumulator cell 3 and the housing wall 5, it is also possible in other exemplary embodiments for the accumulator cell 3 to be adjacent to the housing wall 5 without mutable intermediate piece 9. Here, two or more of the intermediate pieces 8 arranged between the accumulator cells 3 take the form of mutable intermediate pieces 9. The gap between the accumulator cells 3 or a non-mutable intermediate piece 8 and the housing wall 5 is reduced by the expansion of the mutable intermediate pieces 9 arranged between the accumulator cells 3 in such a way until the accumulator cells 3 are braced in the housing 2.

It can be gathered in particular from FIGS. 1 and 8 that the mutable intermediate pieces 9 arranged at the end sides have a second thickness 13 in their second state 11 that is greater than a corresponding thickness of one of the intermediate pieces 8 arranged between the accumulator cells 3. In the present example, both mutable intermediate pieces 9 arranged at the end sides have a second thickness 13 in the second state 11 that is greater than the thickness of the remaining intermediate pieces 8 arranged between the accumulator cells 3.

The remaining intermediate pieces 8 arranged between the accumulator cells 3 can in principle each likewise be mutable intermediate pieces 9. Alternatively, these intermediate pieces 8 can each be planar heat-conducting plates 15.

Figure 4:
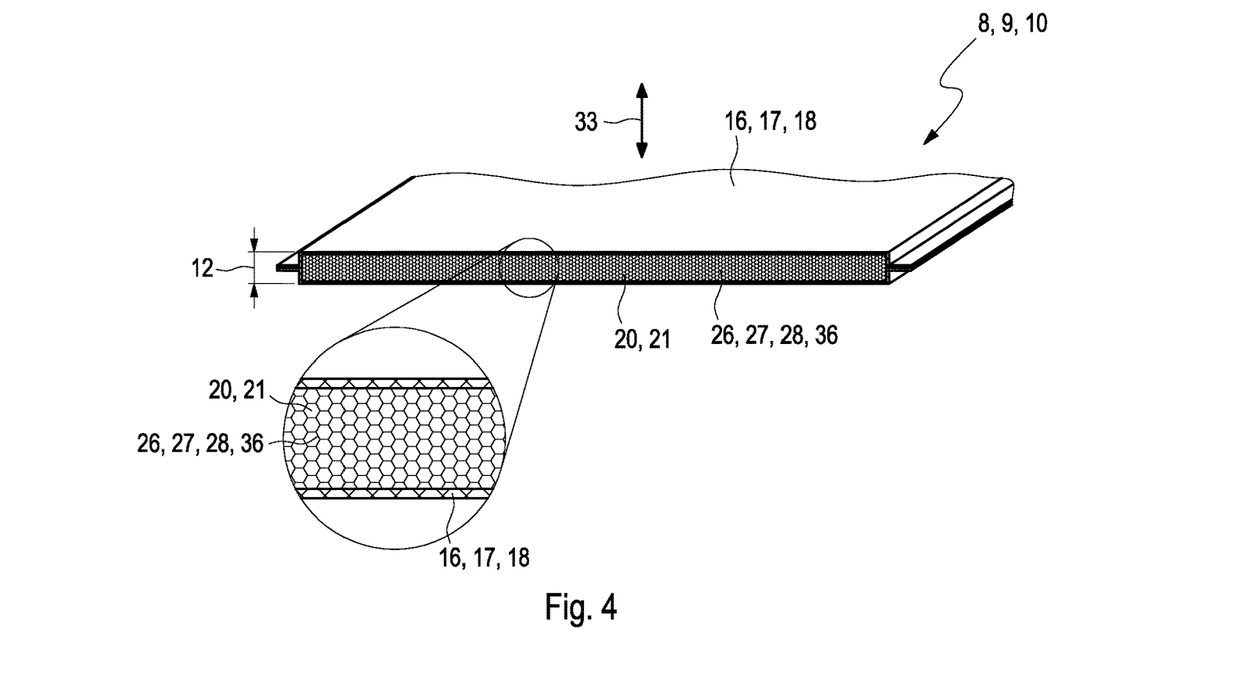
FIG. 4 shows an isometric view of a mutable intermediate piece in section in a first state of the mutable intermediate piece.
Figure 5:
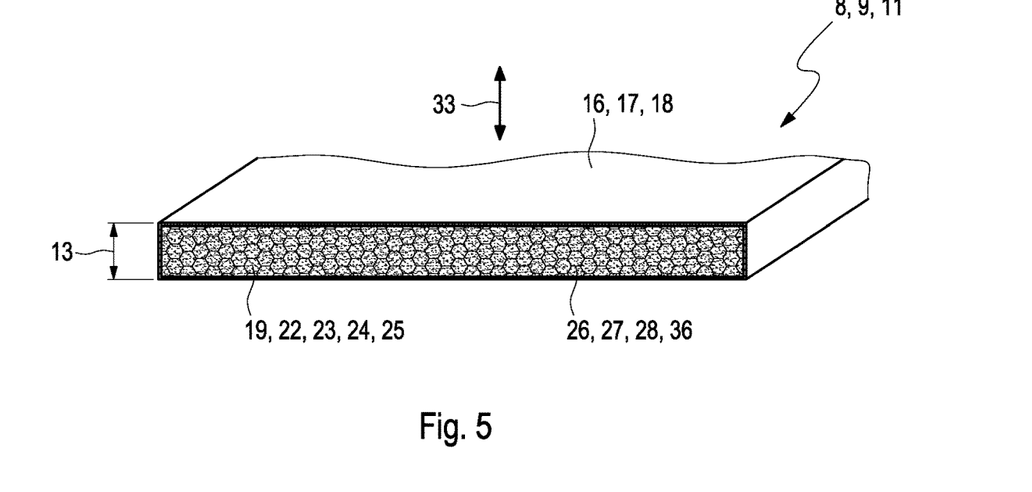
FIG. 5 shows the view from FIG. 4 in a second state of the mutable intermediate piece.

In FIGS. 4 and 5, one of the mutable intermediate pieces 9 is illustrated in an isometric and cutaway view, with FIG. 4 showing the first state 10 and FIG. 5 showing the second state 11. In the example shown, the mutable intermediate piece 9 has an envelope 16, in particular an outer envelope 17. The envelope 16 is designed to be deformable, for example as a plastic film 18.

To change the mutable intermediate piece 9 from the first state 10 into the second state 11, in the example shown an indicated filler 19 is introduced into the envelope 16 in such a way that the envelope 16 is expanded in the spacing direction 33 and thus has the second thickness 13 in the second state 11 that is greater than the first thickness 12. In the example shown, a negative pressure is created in the envelope 16 in the first state 10 in such a way that a vacuum 20 or a void 21 is provided in the envelope 16 at least partially, as indicated in the enlarged illustration of FIG. 4, with the result that, to change the mutable intermediate piece 9, the filler 19 is sucked into the envelope 16. Alternatively or additionally, it is conceivable to introduce the filler 19 into the envelope 16 actively, in particular to deliver it into the envelope 16 in order to change the mutable intermediate piece 9 from the first state 10 into the second state 11. The filler 19 is preferably such a one which is at least partially fluidic. The filler 19 can thus be a gas 22, in particular air 23, a foam 24, a gel 25 or any desired mixtures thereof. In addition, the filler 19, in particular if it is or contains foam 24 and/or gel 25, can at least partially cure after being introduced into the envelope 16.

The mutable intermediate piece 9 can alternatively or additionally have a body 26 which is preferably elastic in the spacing direction 33 and expands in the spacing direction 33 to change the mutable intermediate piece 9 into the second state 11. In the example shown in FIGS. 4 and 5, the body 26 is accommodated in the envelope 16. The body 26 can at least partially contain foam rubber 36, in particular taking the form of a foam body 27 or a foam mat 28.

As described above, to change the mutable intermediate piece 9 into the second state 11, the filler 19 is introduced into the envelope 16, with it at least partially penetrating into the body 26, in particular into the foam body 27 or into the foam mat 28, and leading to an expansion of the body 26 in the stacking direction 4, with the result that the mutable intermediate piece 9 has the second thickness 13 in the second state 11.

The envelope 16 can be designed to be closed such that, to introduce the filler 19 into the envelope, a corresponding fluidic connection is required.

Figure 6:
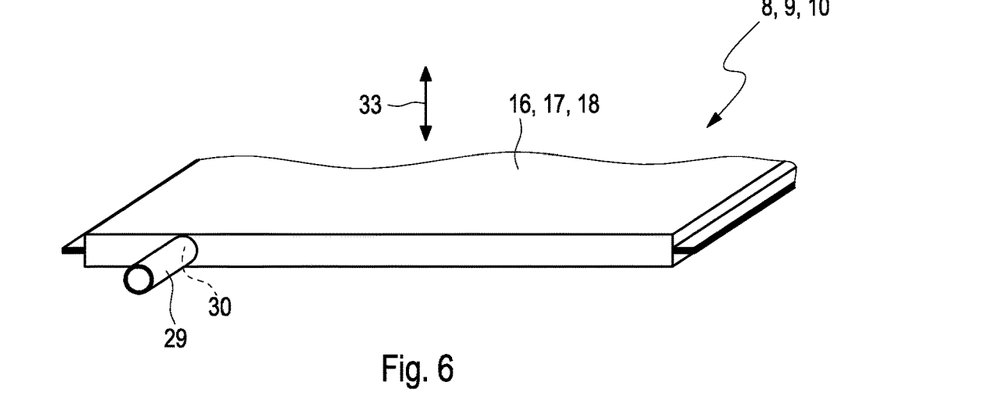
FIG. 6 and FIG. 7 show an isometric view of the mutable intermediate piece in the first state in different embodiments.

In the example of the mutable intermediate piece 9 that is shown in FIG. 6, the fluidic connection is realized by an opening 30 made in the envelope 16 via a nozzle 29. The filler 19 can be introduced into the envelope 16 via the nozzle 29 and the opening 30, and the mutable intermediate piece 9 can be changed into the second state 11.

Figure 7:
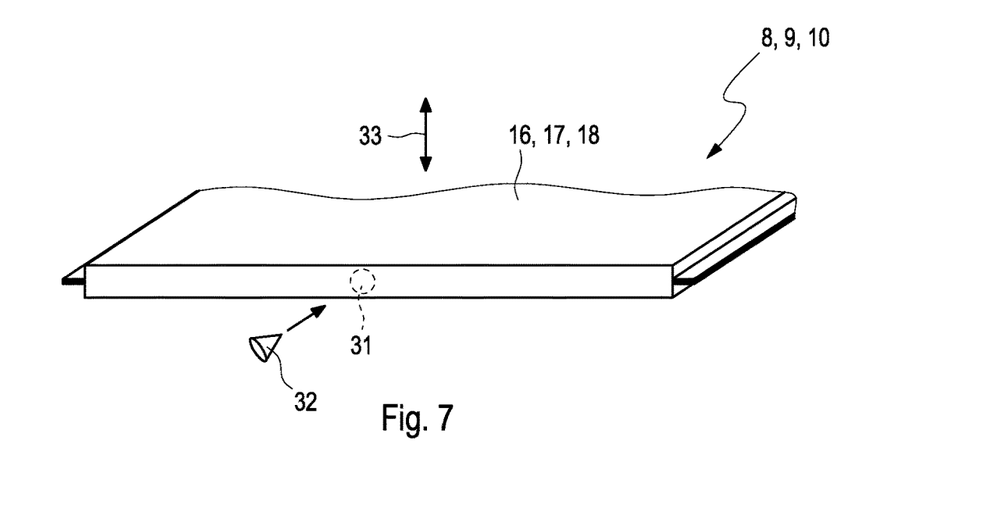

In the example shown in FIG. 7, the fluidic connection is realized by a breach 31 indicated in dashed lines which is made in the envelope 16 and which is produced by severing the material of the envelope 16. For this purpose, the envelope 16, preferably with the mutable intermediate piece 8 being in the state in which it is already arranged in the housing 2, is pierced, with the aid of a piercing tool 32, illustrated in simplified form in FIG. 7 and as indicated by an arrow, into the envelope 16 in order to produce the breach 31. Alternatively or additionally, the envelope 16 can be locally heated in order to produce the breach 31.

In the examples shown, the fluidic connection, that is to say the opening 30 and/or the breach 31, is preferably arranged at an end of the envelope 16 or of the mutable intermediate piece 9 that is situated transversely to the stacking direction 4, preferably in the insertion direction 7. This allows a considerably simpler introduction of the filler 19 into the mutable intermediate piece 9.

The respective mutable intermediate piece 9, in particular the respective intermediate piece 8, is preferably flexible in the spacing direction 33 in such a way that it can compensate for thermally and thermomechanically induced expansions and contractions of the accumulator cells 3 in the spacing direction 33. This can be realized in particular by the choice of the body 26 and/or the amount introduced into the envelope 16, in particular the volume introduced into the envelope 16, of the filler 19.

The piercing tool 32 shown in FIG. 7 can be mounted in principle within the housing 2 on the housing 2 in such a way that the breach 31 is produced when closing the housing 2. For this purpose, the piercing tool 32 can be mounted on a cover (not shown) of the housing 2 that closes the housing 2.

The accumulator 1 also preferably has a closure mechanism (not shown) with a closure element (not shown), for example an elastomer, in particular an elastomer disc which closes, preferably automatically, the breach 31 or the opening 30 after the filler 19 has been introduced into the envelope 16 and the second state 11 has been reached.

The respective intermediate element 8 which follows at least one of the accumulator cells 3 in the stacking direction 4, in particular the respective mutable intermediate piece 9 in the second state 11, preferably bears flat against the at least one accumulator cell 3 which is adjacent in the stacking direction 4, with the result that this at least one accumulator cell 3 is uniformly and flatly loaded and prestressed in the stacking direction 4.

In the example shown in FIG. 8, the respective mutable intermediate piece 9 arranged transversely to the stacking direction 4 between one of the housing walls 5 and the accumulator cells 3 preferably additionally bears flat against the accumulator cells 3 in the second state 11, with the result that the accumulator cells 3 are uniformly loaded and prestressed transversely to the stacking direction 4.

The respective accumulator cell 3 can in principle be configured in any desired manner. The respective accumulator cell 3 can in particular be a pouch cell 34 or a prismatic cell 35.

The invention claimed is:

1. An accumulator, comprising:
    a housing with at least two mutually opposite housing walls;
    accumulator cells arranged between the housing walls and following one another in a stacking direction;
    a plurality of intermediate pieces arranged in the housing;
    a first intermediate piece of the plurality of intermediate pieces arranged between one of the accumulator cells situated on an end side in the stacking direction and one of the housing walls and that retains the accumulator cells in the housing;
    a second intermediate piece of the plurality of intermediate pieces arranged between two of the accumulator cells;
    wherein the first intermediate piece is configured as a first mutable intermediate piece such that the first mutable intermediate piece is changeable between a first state having a first thickness extending in a spacing direction between the associated housing wall and the associated accumulator cell, and a second state having a second thickness extending in the spacing direction, wherein the second thickness is greater than the first thickness;
    wherein, in the state in which the first mutable intermediate piece and the accumulator cells are arranged in the housing, the first mutable intermediate piece is changed into the second state;
    wherein the first mutable intermediate piece includes a deformable envelope;
    wherein, to change from the first state into the second state, an at least partially fluidic filler is introduced into the envelope;
    wherein the second thickness of the first mutable intermediate piece is greater than a thickness, extending in the stacking direction, of the second intermediate piece;
    wherein the first mutable intermediate piece is composed of a material; and
    wherein the filler includes additive particles having increased heat conductivity relative to the material of the first mutable intermediate piece.

2. The accumulator according to claim 1, wherein the first mutable intermediate piece flatly loads the associated accumulator cell.

3. The accumulator according to claim 1, wherein the first mutable intermediate piece is elastic in the spacing direction.

4. The accumulator according to claim 1, wherein:
the plurality of intermediate pieces includes a second mutable intermediate piece; and
the second mutable intermediate piece is arranged between at least one of the accumulator cells and one of the housing walls in a direction extending transversely to the stacking direction.

5. The accumulator according to claim 1, wherein the envelope is a closed envelope.

6. The accumulator according to claim 1, wherein the envelope has a closable opening through which the filler is introducible into the envelope.

7. The accumulator according to claim 6, wherein the closable opening is a nozzle.

8. The accumulator according to claim 1, wherein:
the first mutable intermediate piece further includes a body which is deformable in the spacing direction; and
the body is disposed in an interior space of the envelope and, when the at least partially fluidic filler is introduced into the envelope, the body is penetrated by the at least partially fluidic filler and expands in the spacing direction to change the first mutable intermediate piece into the second state.

9. An accumulator, comprising:
a housing with at least two mutually opposite housing walls;
accumulator cells arranged between the housing walls and following one another in a stacking direction; and
at least one intermediate piece arranged in the housing between at least one of the accumulator cells and one of the housing walls and that retains the accumulator cells in the housing;
wherein at least one intermediate piece is configured as a mutable intermediate piece in such a way that the mutable intermediate piece is changeable between a first state having a first thickness extending in a spacing direction between the associated housing wall and the associated at least one of the accumulator cells, and a second state having a second thickness extending in the spacing direction, wherein the second thickness is greater than the first thickness;
wherein, in the state in which the mutable intermediate piece and the accumulator cells are arranged in the housing, the mutable intermediate piece is changed into the second state;
wherein at least one mutable intermediate piece includes a body and a deformable envelope;
wherein the body is disposed in the envelope and expands in the spacing direction when an at least partially fluidic filler is introduced into the envelope to change the mutable intermediate piece into the second state;
wherein at least a portion of the at least one mutable intermediate piece is composed of a material; and
wherein the filler includes additive particles having increased heat conductivity relative to the material of the at least one mutable intermediate piece.

10. The accumulator according to claim 9, wherein the body is a foam rubber mat.

11. The accumulator according to claim 1, wherein the second intermediate piece is one of (i) a mutable intermediate piece and (ii) a non-mutable metal plate.

12. The accumulator according to claim 1, wherein the filler is at least one of (i) a gel and (ii) a foam, and is at least partially cured in the envelope.

13. The accumulator according to claim 1, wherein:
the housing includes a cover and a piercing tool; and
the piercing tool is mounted on the cover such that at least a portion of the first mutable intermediate piece is severed and pierced by the piercing tool when the cover is arranged on and closes the housing.

14. The accumulator according to claim 13, wherein:
the first mutable intermediate piece includes an automatically closing elastomeric disc; and
the elastomeric disc is arranged on the first mutable intermediate piece such that the elastomeric disc is pierced by the piercing tool when the cover is arranged on and closes the housing.

15. The accumulator according to claim 1, wherein the filler is a gel.

16. The accumulator according to claim 9, wherein the filler is a gel.

17. The accumulator according to claim 9, wherein the at least one mutable intermediate piece is arranged between at least one of the accumulator cells and one of the housing walls in a direction extending transversely to the stacking direction.

18. The accumulator according to claim 9, wherein the body is disposed in an interior space of the envelope and, when the at least partially fluidic filler is introduced into the envelope, the body is penetrated by the at least partially fluidic filler and expands in the spacing direction to change the mutable intermediate piece into the second state.

19. The accumulator according to claim 9, wherein:
the housing includes a cover and a piercing tool; and
the piercing tool is mounted on the cover such that at least a portion of the at least one mutable intermediate piece is severed and pierced by the piercing tool when the cover is arranged on and closes the housing.

20. The accumulator according to claim 19, wherein:
the at least one mutable intermediate piece includes an automatically closing elastomeric disc; and
the elastomeric disc is arranged on the at least one mutable intermediate piece such that the elastomeric disc is pierced by the piercing tool when the cover is arranged on and closes the housing.

* * * * *